Dec. 15, 1959    B. P. MARPLES ET AL    2,917,681
ELECTRICALLY OPERABLE PRIME MOVERS
Filed Aug. 23, 1957

Inventors
BERNARD P. MARPLES & ALAN FOSTER
By
Attorney

United States Patent Office 2,917,681
Patented Dec. 15, 1959

2,917,681

ELECTRICALLY OPERABLE PRIME MOVERS

Bernard Philip Marples, Sanderstead, and Alan Foster, Croydon, England, assignors to Powers-Samas Accounting Machines Limited, London, England, a British company Application August 23, 1957, Serial No. 679,936

Claims priority, application Great Britain September 26, 1956

8 Claims. (Cl. 317—171)

This invention relates to electrically operable prime movers.

As is well understood solenoids are often employed to impart lengthwise movement to mechanical elements, but such solenoids are relatively costly to produce and usually occupy a relatively considerable space which often renders the use thereof difficult in circumstances where only restricted space is available, particularly when a number of solenoids are required to be disposed in close proximity one to another.

It is a main object of the present invention to provide an electrically operable prime mover capable of performing the functions heretofore frequently performed by a solenoid, which is more economical to produce than a solenoid, and which will occupy only a relatively small space thus permitting a relatively large number of prime movers to be located adjacent one to another within a relatively small area.

Figure 1:
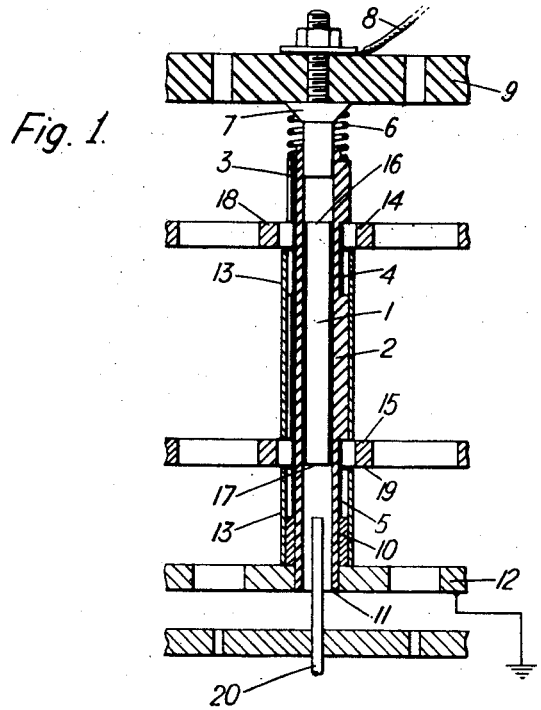
Figure 2:
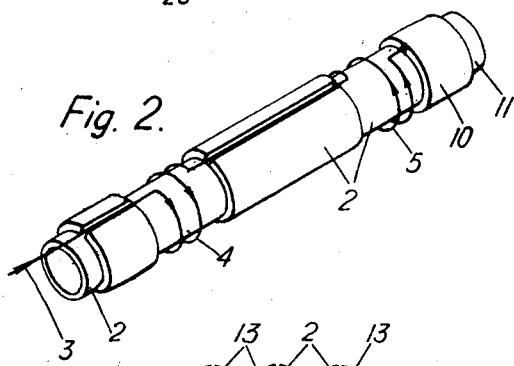
Figure 3:
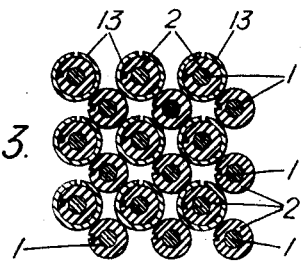

In order that the invention may be clearly understood one embodiment thereof will now be described, by way of example with reference to the accompanying diagrammatic drawings, in which:

Fig. 1 is a sectional elevation of an electrically operable prime mover according to the invention, Fig. 2 is a pictorial view of a part of the apparatus illustrated in Fig. 1, and Fig. 3 is a diagrammatic illustration of the manner in which a plurality of prime movers can be located in a small area.

Referring to the drawings, the prime mover comprises a mechanically free permanent magnet in the form of a cylindrical rod 1 which is disposed within an electrically insulating tube 2 for lengthwise movement axially of the tube in one direction only away from a datum position, Fig. 1, on the application of electric current to an electrically conductive wire 3, Fig. 2, which is applied to the exterior of the tube 2 and is in part wound therearound to provide two oppositely wound coils 4, 5, spaced apart axially of the tube. The coil 4 comprises a south/north winding and the coil 5 comprises a north/south winding so that the remote ends of the coils are of like polarity. The length of the magnet 1 is such that when it is in its datum position, as shown in Figure 1, one pole of the permanent magnet 1 is at the remote end of the coil 4, and the other pole of the magnet 1 is at the inner end of the coil 5. On the application of electric current to the coils the remote end of coil 4 and the inner end of coil 5 will have the same polarity as the poles of the magnet 1 surrounded thereby so that the magnet, due to repulsion, will be caused quickly to move axially of the tube. One end of the wire 3 is connected to a Phosphor bronze spring 6 making electrical contact with a terminal plug 7 fitted into the tube 2 and to which an input wire 8 is attached. The terminal plug is secured to an electrically insulated plate 9. The other end of the wire 3 is connected to a copper ring 10 surrounding the lower end of the tube 2 the portion 11 of which fits within a brass plate 12 which is suitably connected to earth.

To screen the device from similar devices which may be in close disposition relative thereto ferro-magnetic sleeves 13 are disposed about the tube, as illustrated in Fig. 1, the sleeves being split sleeves, the splits, 113 Fig. 3, of which extend lengthwise of the sleeves.

Restoring means are provided to ensure, when no current is applied to the coils, the location of the magnet 1 in the datum or starting position thereof, that is the position illustrated in Fig. 1, and in order that the magnet 1 may be mechanically free in the tube, that is not mechanically supported, such means may consist of a suitable spring or other mechanical action. In the preferred embodiment of the invention, however, the magnet is unsupported in the tube, that is to say it is not physically supported, and the restoring means comprises two ferromagnetic elements 14, 15, which are located between the plates 9 and 12. The ferro-magnetic element 14 is disposed about the remote end of coil 4, and the ferromagnetic element 15 is disposed about the inner end of coil 5, that is the elements 14 and 15 are spaced apart axially thereof by a distance equal to the length of the magnet 1 in a manner such that, as can be seen from Fig. 1, the end faces 16, 17 of the magnet are located substantially in the planes of the remote faces 18, 19 of the ferro-magnetic elements. The ferro-magnetic elements 14, 15 conveniently comprise steel plates which are retained in position between the plates 9 and 12 by distance pieces, not shown, and which connect the parts 9, 14, 15 and 12 to form a unitary structure capable of supporting a plurality of prime movers in close proximity one with another, as illustrated in Fig. 3.

In the embodiment of the invention illustrated in Fig. 1 it is assumed that the prime mover is adapted to effect operation of a Bowden wire, not shown, which may, for example, in turn be arranged to effect operation of the set pins provided in a set bar unit associated with apparatus for effecting punching of statistical record cards. To this end, the magnet 1, on operation thereof, is adapted to impinge against a brass pin 20 supported in any suitable manner for lengthwise movement by the magnet 1 in a downward direction, the pin 20, it being understood, being in juxtaposition with the end of the Bowden wire, not shown, to be operated thereby.

In operation, when current is applied to the input wire 8 it passes through the coils 4, 5 thereby setting up the respective south/north and north/south fields. As can be seen from Fig. 1 the magnet 1 is is disposed to lie vertically south and north so that the upper end of the magnet, being the south pole thereof, is in the south field of coil 4 and the lower end of the magnet, being the north pole thereof, is in the north field of coil 5. Accordingly, because the magnet 1 is mechanically free it will move rapidly downwards to take up a new position such that the upper end thereof lies in the north field of coil 4 and the lower end lies in the south field set up by the coil 5. As can be seen from Fig. 1, a space is provided between the lower end face 17 of the magnet 1 and the upper end of the pin 20, thus ensuring that the magnet 1 during downward movement thereof builds up sufficient momentum to impart the desired lengthwise movement to the pin 20. When the current is cut off from the input wire 8 the magnet 1 will be restored to the datum position thereof shown in Fig. 1, being attracted to the position by co-operation with the ferro-magnetic elements 14, 15.

In the description just given as to the mode of operation of the device the current applied to the input wire 8 is assumed to be direct current. It will be understood, however, that if it is desired to provide a continuous succession of impulses by the magnet 1, this may be effected by applying alternating current to the input wire 8 in which event the magnet 1 will oscillate in phase with the cycles of alternating current. The ferro-magnetic plates 14, 15, will co-operate with the magnet to restore it to its starting position illustrated in Fig. 1 in the event that the alternating current should be cut off at a time when the magnet is in a position other than the starting position thereof.

It will also be understood that although in the example given above the prime mover according to the invention has been described with reference to its application to effecting movement of a Bowden wire, it is also capable of being employed for the purpose of imparting movement to mechanical elements other than Bowden wires.

It has been stated above that the devices are provided with split screening sleeves 13 but, in practice, it has been found that, in order to economise space, by arranging the devices in rows, as indicated in Fig. 3, in a manner such that the devices of one row are offset in relation to the devices of adjoining rows it is necessary, in order to effect adequate screening, only to provide screening sleeves on the devices contained in alternate rows. It will be noted from Fig. 3 that a plurality of prime movers as described herein can be located within a very small area, the diameter of a prime mover being of the order of $5/16$ of an inch.

We claim:

1. An electrically operable prime mover comprising an electrically insulating tube, two coils connected in series and spaced apart axially along the exterior of the tube, said coils being oppositely wound to provide at the remote ends thereof magnetic fields of like polarity on the application of electric current to the coils, two ferro-magnetic elements respectively disposed about the remote end of one of the coils and the inner end of the other coil, and a mechanically free permanent magnet disposed inside the tube and supported by co-operation with said ferro-magnetic elements in a datum position in which one pole of the permanent magnet is at said remote end of one of the coils and the other pole is at said inner end of the other coil when there is no current in the coils so that on application of current to the coils the permanent magnet is moved lengthwise of the tube without mechanical restraint and on cessation of the current is restored to its datum position by co-operation with the ferro-magnetic elements.

2. An electrically operable prime mover according to claim 1, including ferro-magnetic sleeves split lengthwise thereof and disposed about the tube to effect screening of the magnet.

3. An electrically operable prime mover according to claim 2, including an electrically conductive plug fitted into one end of the tube and an electrically conductive spring connected to the input end of said coils and making electrical connection with said plug.

4. An electrically operable prime mover comprising a dielectric tube, selectively actuated means on said tube for creating two axially spaced magnetic fields having similar poles at the remote ends thereof, said means including two coils wound around said tube, an elongated magnet disposed within said tube the ends of which are in alignment with said coils, a ferro-magnetic element at least partially surrounding one end of each coil at corresponding positions, said elements having their remote surfaces spaced apart a distance substantially equal to the length of said magnet, said magnet being freely suspended within said tube by means of the magnetic attraction of the ferro-magnetic elements to the magnets, said magnet being disposed so that the poles thereof are repelled by the created magnetic fields in a direction away from the ferromagnetic elements when actuated so that the magnet moves, and is returned to its original position by attraction to the ferromagnetic elements when the coils are deactuated.

5. An electrically operable prime mover according to claim 4 wherein said tube is vertically disposed and the ferro-magnetic elements are in alignment with the upper ends of said coils whereby upon actuation of said coils the movement of the magnet caused by the repelling force is augmented by the full force of gravity acting upon the magnet.

6. An electrically operable prime mover according to claim 4 wherein said tube is provided with a pair of axially spaced circumferential channels, said coils being disposed in said channels within the confines of the peripheral surface of said tube so that a plurality of tubes may be disposed in a relatively small area.

7. An electrically operable prime mover comprising a dielectric tube, selectively actuated means on said tube for creating two axially spaced magnetic fields having similar poles at the remote ends thereof, an elongated magnet disposed within said tube, a ferro-magnetic element at least partially surrounding the tube in the area of each magnetic field, said magnet being disposed so that the poles thereof are repelled by the created magnetic fields in a direction away from the ferro-magnetic elements, said selectively actuated means including two coils, circumferential channels formed in said tubes, said coils being disposed within said channels and within the confines of the peripheral surface of said tube, whereby a plurality of said tubes may be disposed in a relatively small area.

8. An electrically operable prime mover according to claim 7 comprising a ferro-magnetic sleeve disposed about the tube to screen the field of the magnet.

References Cited in the file of this patent

UNITED STATES PATENTS 2,167,078   Lakatos _____ July 25, 1939

FOREIGN PATENTS 665,565   Germany _____ Sept. 29, 1938